United States Patent
Huang

(10) Patent No.: US 9,098,232 B2
(45) Date of Patent: Aug. 4, 2015

(54) AUDIO CONTROL APPARATUS AND SYSTEM

(71) Applicant: YA HORNG ELECTRONIC CO., LTD., Tainan (TW)

(72) Inventor: Jin-Yi Huang, Tainan (TW)

(73) Assignee: YA HORNG ELECTRONIC CO., LTD., Tainan (TW)

( * ) Notice: Subject to any disclaimer, the term of this patent is extended or adjusted under 35 U.S.C. 154(b) by 323 days.

(21) Appl. No.: 13/739,765

(22) Filed: Jan. 11, 2013

(65) Prior Publication Data

US 2013/0182863 A1 Jul. 18, 2013

(30) Foreign Application Priority Data

Jan. 18, 2012 (TW) .............................. 101101948 A

(51) Int. Cl.
*H03G 3/00* (2006.01)
*G06F 3/16* (2006.01)
*G11B 3/64* (2006.01)
*G11B 31/00* (2006.01)

(52) U.S. Cl.
CPC .. *G06F 3/16* (2013.01); *G11B 3/64* (2013.01); *G11B 31/00* (2013.01); *H04R 2205/021* (2013.01)

(58) Field of Classification Search
CPC ...... H04R 5/02; H04R 2499/15; H04R 5/033; H04N 5/642; G11B 27/105; G11B 20/10527; G06F 3/16
See application file for complete search history.

(56) References Cited

U.S. PATENT DOCUMENTS

| | | | |
|---|---|---|---|
| 2002/0093886 A1* | 7/2002 | Ijichi et al. | 369/30.09 |
| 2005/0117601 A1* | 6/2005 | Anderson et al. | 370/465 |
| 2007/0070856 A1* | 3/2007 | Tebele | 369/85 |
| 2008/0025172 A1* | 1/2008 | Holden et al. | 369/47.35 |
| 2009/0326689 A1* | 12/2009 | Allard | 700/94 |
| 2014/0031962 A1* | 1/2014 | Akatsu | 700/94 |
| 2014/0335834 A1* | 11/2014 | Emerson, III | 455/414.1 |
| 2014/0336797 A1* | 11/2014 | Emerson, III | 700/94 |
| 2014/0336798 A1* | 11/2014 | Emerson, III | 700/94 |
| 2014/0336799 A1* | 11/2014 | Emerson, III | 700/94 |

* cited by examiner

Primary Examiner — Tan X Dinh

(74) Attorney, Agent, or Firm — Muncy, Geissler, Olds & Lowe, P.C.

(57) ABSTRACT

An audio control apparatus is adapted for use with an external portable electronic device having display functionality, and includes a data storage device, an operation controller operable to access and process audio data stored in the data storage device, and to output information of the audio data, a user control device operable by a user to control operation of the operation controller, and a function expanding interface coupled to the operation controller and configured to transmit the information of the audio data for reception and subsequent display by the external portable electronic device.

12 Claims, 5 Drawing Sheets

AUDIO CONTROL APPARATUS AND SYSTEM

CROSS-REFERENCE TO RELATED APPLICATION

This application claims priority to Taiwanese Application No. 101101948, filed on Jan. 18, 2012.

BACKGROUND OF THE INVENTION

1. Field of the Invention

The invention relates to an audio player system, and more particularly to an audio control apparatus system suitable for use when playing recorded music for an audience.

2. Description of the Related Art

A conventional audio controller is used when playing recorded music for an audience. A performer may conduct music modulation, playback speed adjustment, or audio mixing processing through the audio controller. The conventional audio controller has a monochrome liquid crystal display, which has a limited display area due to cost concern, for displaying characters, so that only music titles and audio volume information are normally shown thereon, and more complete music information is unable to be displayed.

On the other hand, the performer may pick fragments from different music tracks for playback so as to generate novel effects. To facilitate switching between different music tracks, some audio controllers are designed to be dual-audio playable, so that two different music tracks can be played at the same time and the performer may selectively control output of audio signals reproduced from the music tracks. While the dual-audio playable audio controller may be convenient for the performer to operate, the relatively complicated structure thereof results in higher costs.

SUMMARY OF THE INVENTION

Therefore, an object of the present invention is to provide an audio control apparatus that enables complete display of music information.

According to one aspect of the present invention, an audio control apparatus is adapted for use with an external portable electronic device having display functionality, and comprises:

a data storage device for storing audio data;
an operation controller coupled to the data storage device and having
  an audio playback module operable to access the audio data stored in the data storage device, and to process the audio data accessed thereby to obtain audio signals, and
  an audio information module operable to output information of the audio data accessible to the audio playback module;
a user control device coupled to the operation controller and operable by a user to control operation of the audio playback module;
an audio output device coupled to the operation controller and configured to output the audio signals received from the operation controller; and
a function expanding interface coupled to the operation controller and configured to transmit the information of the audio data accessible to the audio playback module for reception and subsequent display by the external portable electronic device.

According to another aspect of the present invention, an audio control system comprises:

an external portable electronic device having display functionality; and
an audio control apparatus including:
  a data storage device for storing audio data;
  an operation controller coupled to the data storage device and having
    an audio playback module operable to access the audio data stored in the data storage device, and to process the audio data accessed thereby to obtain audio signals, and
    an audio information module operable to output information of the audio data accessible to the audio playback module;
  a user control device coupled to the operation controller and operable by a user to control operation of the audio playback module;
  an audio output device coupled to the operation controller and configured to output the audio signals received from the operation controller; and
  a function expanding interface coupled to the operation controller and the external portable electronic device and configured to transmit the information of the audio data accessible to the audio playback module for reception and subsequent display by the external portable electronic device.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
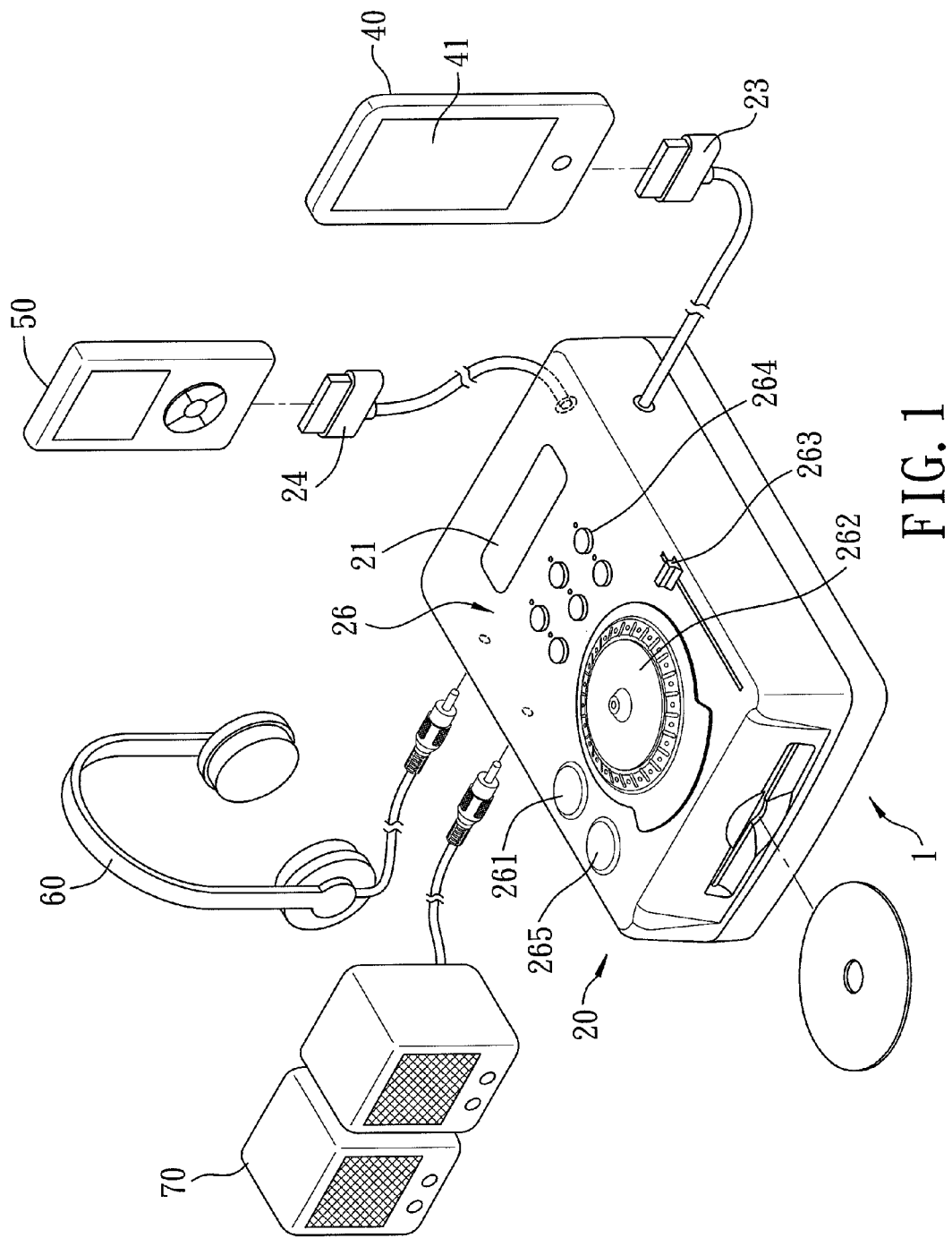
FIG. 1 is a perspective view showing a first preferred embodiment of the audio control system according to the present invention.
Figure 2A:
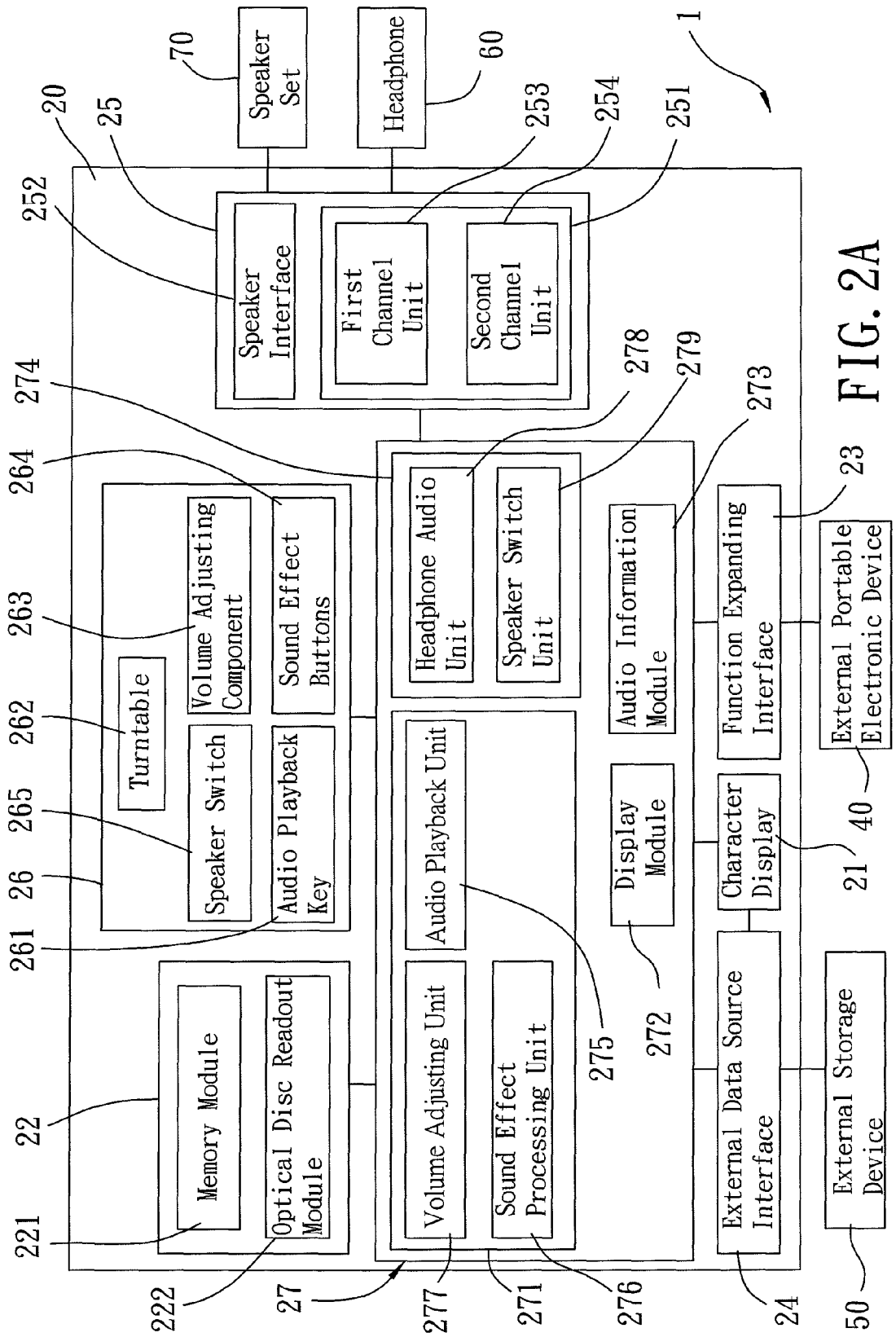
FIGS. 2A and 2B are block diagrams illustrating the first preferred embodiment and an audio control program installed in an external portable electronic device.
Figure 2B:
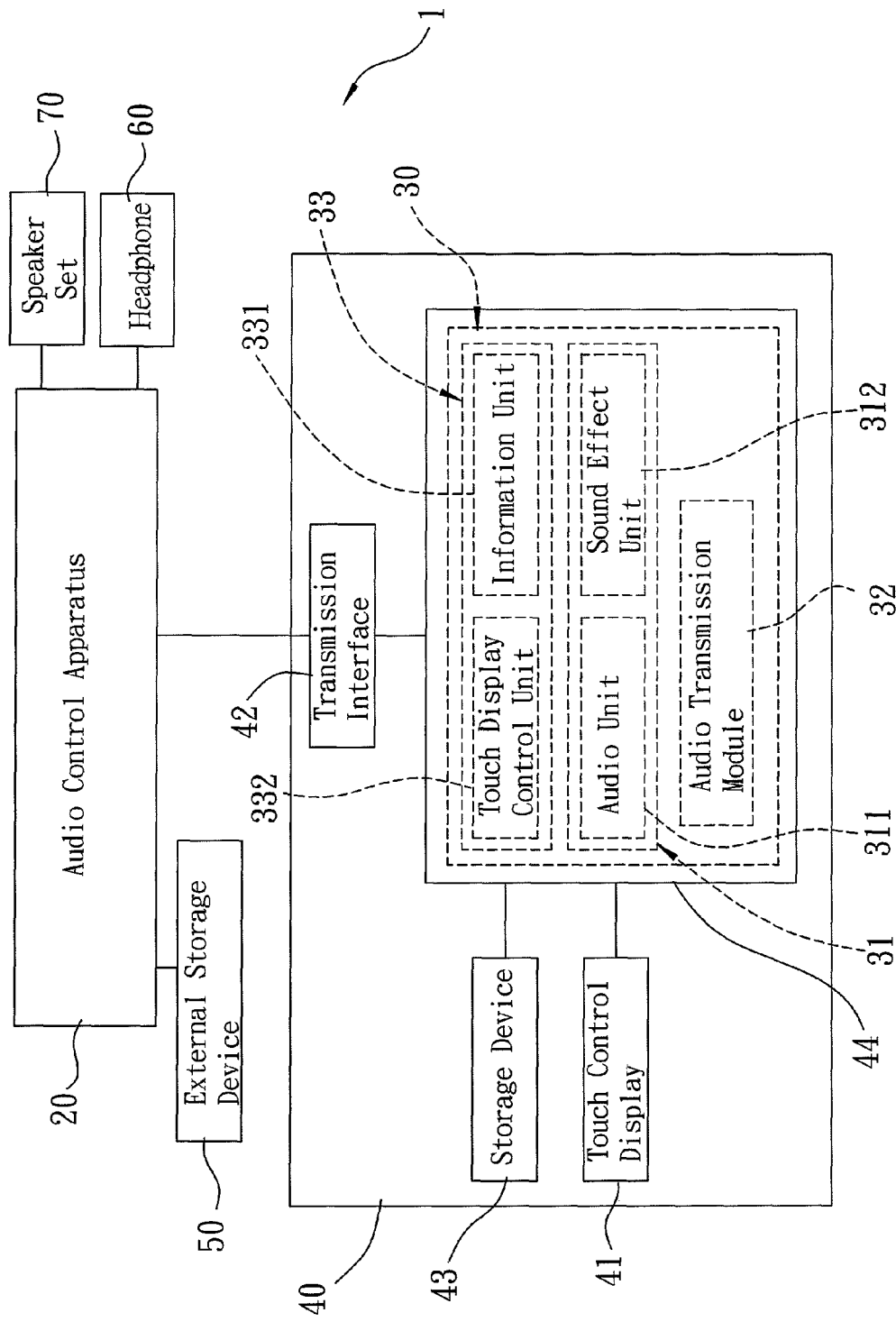

Referring to FIG. 1 and FIGS. 2A, 2B, a first preferred embodiment of the audio control system 1 according to this invention is shown to be capable of accessing audio data for audio playback through a headphone 60 and a speaker set 70. The audio control system 1 includes an audio control apparatus 20 and an external portable electronic device 40. The external portable electronic device 40 includes a touch control display 41, a transmission interface 42 for data and power transmission, a storage device 43 for program and data storage, and an operation circuit 44. In the first preferred embodiment, the external portable electronic device 40 may be a smart phone, a tablet computer, a media player, or any other touch control portable electronic device that is configured, such as via a proprietary audio control program 30, to enable cooperation between the external portable electronic device 40 and the audio control apparatus 20.

The audio control apparatus 20 includes a character display 21 operable to display characters, a data storage device 22 for storing audio data, an operation controller 27 coupled to the data storage device 22, and a user control device 26, an audio output device 25, an external data source interface 24, and a function expanding interface 23 that are coupled to the operation controller 27.

In this embodiment, the character display 21 is shaped as a flat rectangular cuboid, and is coupled to the operation controller 27. In this embodiment, the data storage device 22 includes a memory module 221 capable of storing audio data and an optical disc readout module 222 operable to read audio data stored in an optical disc. The audio output device 25 includes a headphone interface 251 for coupling to the headphone 60 and a speaker interface 252 for coupling to the speaker set 70. The headphone interface 251 has a first channel unit 253 and a second channel unit 254 that correspond to a left channel and a right channel of the headphone 60, respectively.

In this embodiment, the external data source interface 24 is a connector for connecting to an external storage device 50 having external audio data stored therein.

The operation controller 27 has an audio playback module 271, a display module 272, an audio information module 273, and an output control module 274. The user control device 26 is operable by a user to control operation of the audio playback module 271, and includes an audio playback key 261, a turntable 262 for user operation, a volume adjusting component 263, several sound effect buttons 264, and a speaker switch 265.

The audio playback module 271 is operable to access the audio data stored in the memory module 221, to access the audio data stored in the optical disc through the optical disc readout module 222, to access the external audio data stored in the external storage device 50 through the external data source interface 24, to process the audio data accessed thereby to obtain audio signals, and to transmit the audio signals to the output control module 274, which in turn drives the audio output device 25. In this embodiment, the audio playback module 271 includes an audio playback unit 275 coupled to the data storage device 22 and the external data source interface 24, a sound effect processing unit 276 coupled to the audio playback unit 275, the user control device 26, and the output control module 274, and a volume adjusting unit 277 coupled to the audio playback unit 275, the sound effect processing unit 276, and the user control device 26. The audio playback unit 275 is operable to access the audio data stored in the data storage device 22 and the external audio data stored in the external storage device 50 through the external data source interface 24. The sound effect processing unit 276 is operable to generate the audio signals by performing audio modulation (such as playback speed adjustment), or audio mixing processing on the audio data accessed by the audio playback unit 275 in response to control from the sound effect buttons 264 of the user control device 26. In one embodiment, the sound effect processing unit 276 is operable to mix sound effect of scratching with the audio data accessed by the audio playback unit 275. Since the type of sound mixing is not a characterizing feature of this invention, further details of suitable sound mixing techniques will be omitted herein for the sake of brevity. The volume adjusting unit 277 is operable to perform volume adjustment on the audio signals obtained from the audio playback unit 275 in response to control of the user control device 26.

The display module 272 is operable to drive the character display 21, so that the character display 21 displays information of the audio data accessed by the audio playback unit 275. In this preferred embodiment, the display module 272 drives the character display 21 to display title, playback time, and volume information of the audio data accessed by the audio playback unit 275.

The audio information module 273 is operable to output information of the audio data accessible to the audio playback module 271 to the function expanding interface 23. In this embodiment, the audio information module 273 outputs information of the audio data accessed by the audio playback unit 275, and a list of audio files accessible to the audio playback module 271 to the function expanding interface 23, so as to drive the function expanding interface 23 to transmit the information and the list of audio files to the external portable electronic device 40.

The output control module 274 is coupled to the headphone interface 251 and the speaker interface 252, and is operable to modulate and to output the audio signals from the audio playback module 271 and external audio signals received from the function expanding interface 23 to the first and second channel units 253, 254, respectively. The output control module 274 is further operable to provide one of the audio signals from the audio playback module 271 and the external audio signals received from the function expanding interface 23 to the speaker interface 252 in response to user control from the speaker switch 265 of the user control device 26.

In detail, the output control module 274 has a headphone audio unit 278 coupled to the headphone interface 251 and the function expanding interface 23, and a speaker switch unit 279 coupled to the speaker interface 252, the audio playback module 271, the function expanding interface 23, and the user control device 26. The headphone audio unit 278 is operable to modulate and to output the audio signals from the audio playback module 271 and the external audio signals received from the function expanding interface 23 respectively to the first and second channel units 253, 254 of the headphone interface 251, so as to drive the headphone 60. In this embodiment, the first channel unit 253 outputs the audio signals modulated from the audio playback module 271, while the second channel unit 253 outputs the external audio signals received from the function expanding interface 23. That is, the left and right ears of the user receive different audios, respectively. The speaker switch unit 279 is operable to provide one of the audio signals from the audio playback module 271 and the external audio signals received from the function expanding interface 23 to the speaker interface 252 in response to user control from the speaker switch 265 of the user control device 26, so as to drive the speaker set 70. That is, the user may operate the speaker switch 265 to control the music tracks reproduced by the speaker set 70.

The audio playback unit 275 is controllable via the audio playback key 261, so that the user may select the desired audio data therethrough. In addition, the audio playback unit 275 is controllable via the turntable 262 for playback of a specific fragment of the selected audio data. In other words, the user may slide the turntable 262 to perform forward or reverse operation on the selected audio data, so as to adjust playback speed or to playback a specific fragment of the selected audio data.

The audio output device 25 is configured to output the audio signals received from the operation controller 27 and the external audio signals from the function expanding interface 23.

The function expanding interface 23 is coupled to the operation controller 27 and is configured to transmit the information of the audio data accessible to the audio playback module 271 for reception and subsequent display by the external portable electronic device 40, and to permit transmission of external audio signals from the external portable electronic device 40 to the operation controller 27. In this embodiment, the function expanding interface 23 is a connector for connecting to the transmission interface 42 of the external portable electronic device 40.

In the first preferred embodiment, the external portable electronic device 40 is configured to cooperate with the audio control apparatus 20 using the audio control program 30 installed therein. The audio control program 30 includes an audio module 31, an audio transmission module 32, and a touch display module 33.

The audio module 31 enables the operation circuit 44 to access the audio data received from the operation controller 27 of the audio control apparatus 20 through the transmission interface 42, and has an audio unit 311 and a sound effect unit 312. The audio unit 311 enables the operation circuit 44 to access the audio data. The sound effect unit 312 enables the operation circuit 44 to generate the external audio signals by performing volume adjustment, audio modulation (such as playback speed adjustment), or audio mixing processing on the accessed audio data in response to control from the touch control display 41. The audio transmission module 32 enables the operation circuit 44 to modulate the external audio signals, and to drive the transmission interface 42 to transmit the modulated external audio signals to the audio control apparatus 20.

The touch display module 33 has an information unit 331 and a touch display control unit 332. The information unit 331 configures the operation circuit 44 to drive the touch control display 41 to display information. In this embodiment, the information displayed by the touch control display 41 includes the information of the audio data received from the audio control apparatus 20 through the transmission interface 42, the information of the audio data accessed by the operation circuit 44, and the list of audio files accessible to the audio playback module 271 and to the operation circuit 44 through the transmission interface 42. The external portable electronic device 40 is operable for selecting one of the audio files in the list and for requesting from the operation controller 27 the selected one of the audio files in the list via the function expanding interface 23, and the operation controller 27 is further operable to provide the audio data requested by the external portable electronic device 40 to the function expanding interface 23 for receipt by the external portable electronic device 40. In addition, the touch display control unit 332 is operable to configure the operation circuit 44 to drive the touch control display 41 to display images or icons for recognition of touch control regions corresponding to different operating functions. In this embodiment, the touch control unit 332 configures the touch control display 41 to display a turntable image for sliding control by the user, and button images for pressing control by the user. However, due to considerations of functionality, aesthetic appeal, or size of touch control regions, numbers and appearance of the images may vary as desired.

In the first preferred embodiment, the user may couple the external portable electronic device 40 to the audio control apparatus 20 for displaying information of the audio data using the touch control display 41 that has a larger display area. Moreover, the audio control program 30 provides a virtual user interface on the external portable electronic device 40, such that there is a second audio control interface for user operation to playback the audio data and to add sound effects on the audio data, and a second audio control apparatus 20 or a dual-audio control apparatus 20 is not required, thereby resulting in cost savings. In addition, the external data source interface 24 of the audio control apparatus 20 is adapted to be coupled to an external storage device 50, such that the audio control apparatus 20 may update audio data not only using the optical discs, but also through the external data source interface 24, to thereby facilitate data expansion.

In practice, when the audio control apparatus 20 is sold in the market, an optical disc storing the audio control program 30 may accompany the same for installation in the external portable electronic device 40 by the user. Alternatively, the user may download the audio control program 30 from a program download database on the internet, such as App-Store.

It should be noted that, in this embodiment, the function expanding interface 23 and the external data source interface 24 of the audio control apparatus 20 are in the form of connectors. In other embodiments, the function expanding interface 23 and the external data source interface 24 may be disposed within a docking base that is for positioning and connecting with the external portable electronic device 40 and the external storage device 50 by insertion. Implementations of the function expanding interface 23 and the external data source interface 24 should not be limited to those described hereinabove.

Figure 3A:
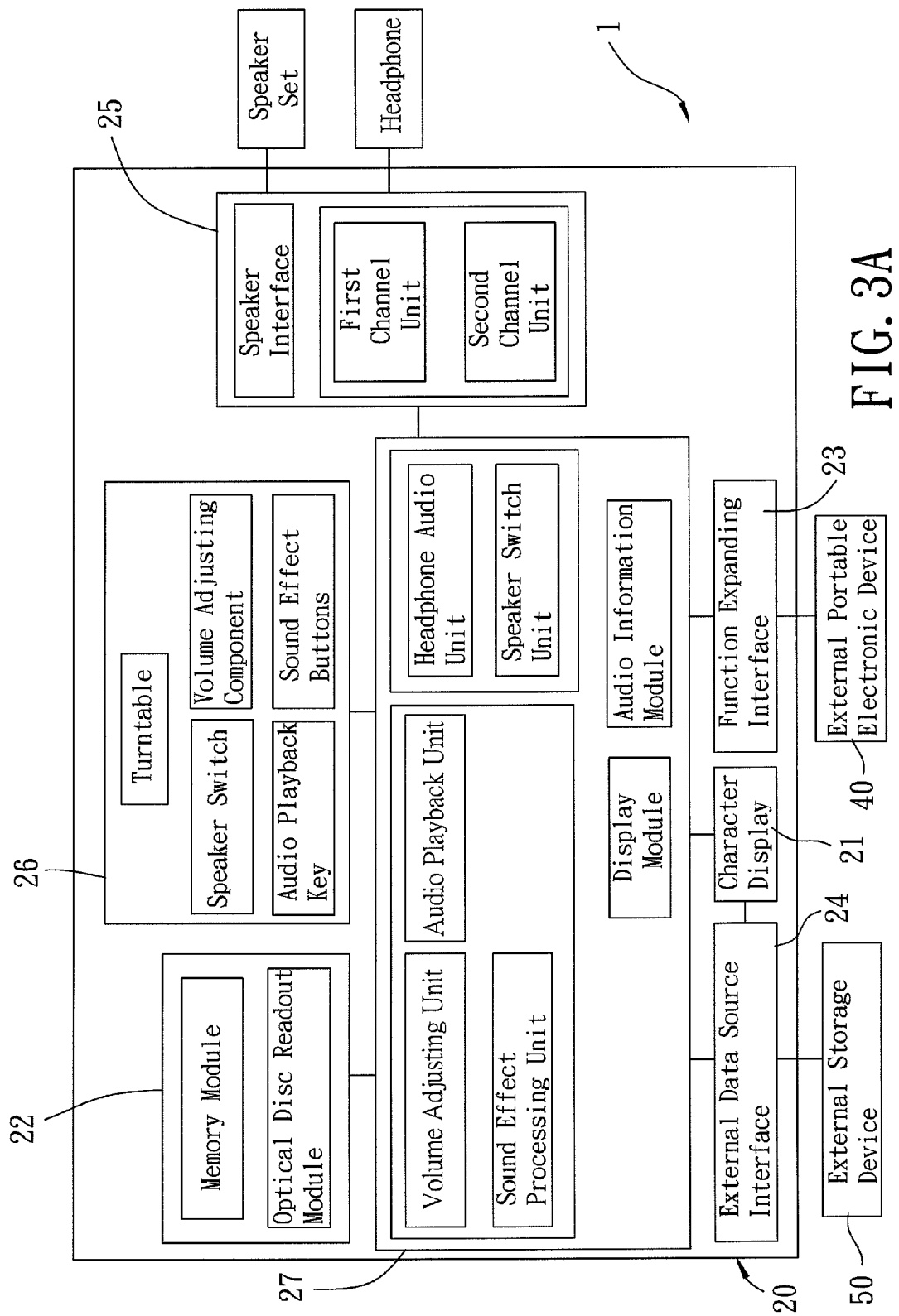
FIGS. 3A and 3B are block diagrams illustrating a second preferred embodiment of the audio control system according to the present invention.
Figure 3B:
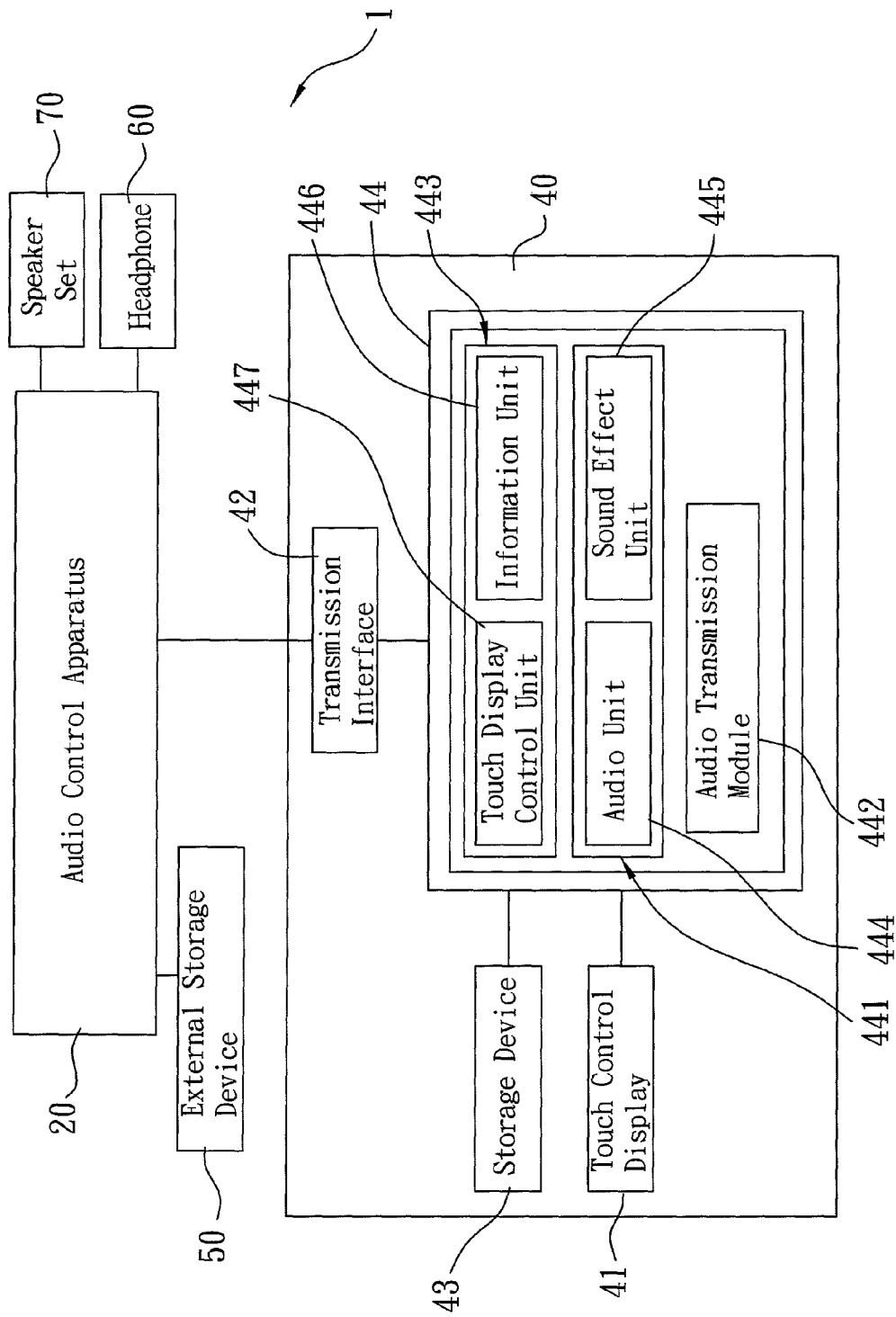

Referring to FIGS. 3A and 3B, a second preferred embodiment of the audio control system 1 according to this invention is shown to have the same functions as those of the first preferred embodiment. The audio control system 1 of the second preferred embodiment includes an audio control apparatus 20 and an external portable electronic device 40 coupled to the audio control apparatus 20, such as by plugging.

The audio control apparatus 20 of the second preferred embodiment is the same as that of the first preferred embodiment.

The external portable electronic device 40 of the second preferred embodiment is similar to that of the first preferred embodiment. The difference between the first and second preferred embodiments resides in that the operation circuit 44 of the external portable electronic device 40 of the second preferred embodiment is configured with an audio module 441, an audio transmission module 442, and a touch display module 443.

The audio module 441 is operable to access the audio data received from the audio control apparatus 20 through the transmission interface 42, and has an audio unit 444 and a sound effect unit 445. The audio unit 444 is operable to access the audio data. The sound effect unit 445 is operable to generate the external audio signals by performing volume adjustment, audio modulation (such as playback speed adjustment), or audio mixing processing on the audio data accessed by the audio unit 444 in response to control from the touch control display 41. The audio transmission module 442 is operable to modulate the external audio signals, and to drive the transmission interface 42 to transmit the modulated external audio signals to the audio control apparatus 20.

The touch display module 443 has an information unit 446 and a touch display control unit 447. The information unit 446 is operable to drive the touch control display 41 to display the information of the audio data received from the audio control apparatus through the transmission interface 42, the information of the audio data accessed by the audio unit 444, and the list of audio files accessible to the audio playback module 271 and to the audio module 441 through the transmission interface 42. In addition, the touch display control unit 447 is operable to drive the touch control display 41 to display images or icons for recognition of touch control regions corresponding to different operating functions.

In the second preferred embodiment, the operation circuit 44 of the external portable electronic device 40 implements audio playback, audio adjustment, and audio information display using built-in hardware circuits to cooperate with the audio control apparatus 20. That is, both of the audio control apparatus 20 and the external portable electronic device 40 are operable by the user to playback the audio data and to add sound effects on the audio data, so that a second audio control apparatus 20 or a dual-audio control apparatus 20 is not required, thereby resulting in cost savings.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An audio control apparatus adapted for use with an external portable electronic device having display functionality, said audio control apparatus comprising:
   a data storage device for storing audio data;
   an operation controller coupled to said data storage device and having an audio playback module operable to access the audio data stored in said data storage device, and to process the audio data accessed thereby to obtain audio signals, and
   an audio information module operable to output information of the audio data accessible to said audio playback module;
   a user control device coupled to said operation controller and operable by a user to control operation of said audio playback module;
   an audio output device coupled to said operation controller and configured to output the audio signals received from said operation controller; and
   a function expanding interface coupled to said operation controller and configured to transmit the information of the audio data accessible to said audio playback module for reception and subsequent display by the external portable electronic device;
   wherein:
      said function expanding interface is further configured to permit transmission of external audio signals from the external portable electronic device to said operation controller;
      said audio output device includes a headphone interface that has a first channel unit and a second channel unit, and a speaker interface; and
      said operation controller further has an output control module that is cooled to said headphone interface and said speaker interface and that is operable to modulate and to output the audio signals from said audio playback module and the external audio signals received from said function expanding interface to said first and second channel units, respectively, and to provide one of the audio signals from said audio playback module and the external audio signals received from said function expanding interface to said speaker interface in response to control from said user control device.

2. The audio control apparatus as claimed in claim 1, wherein said audio playback module includes:
   an audio playback unit operable to access the audio data stored in said data storage device;
   a sound effect processing unit operable to generate the audio signals by performing at least one of playback speed adjustment and audio mixing processing on the audio data accessed by said audio playback unit in response to control from said user control device; and
   a volume adjusting unit operable to perform volume adjustment on the audio signals.

3. The audio control apparatus as claimed in claim 1, further comprising an external data source interface that is coupled to said operation controller and that is for connecting to an external storage device having external audio data stored therein, said audio playback module being operable to access the audio data stored in said data storage device and the external audio data stored in the external storage device.

4. The audio control apparatus as claimed in claim 1, further comprising a character display coupled to and driven by said operation controller to display the information of the audio data accessed by said audio playback module.

5. An audio control system comprising:
   an external portable electronic device having display functionality; and
   an audio control apparatus including:
   a data storage device for storing audio data;
   an operation controller coupled to said data storage device and having an audio playback module operable to access the audio data stored in said data storage device, and to process the audio data accessed thereby to obtain audio signals, and
   an audio information module operable to output information of the audio data accessible to said audio playback module;
   a user control device coupled to said operation controller and operable by a user to control operation of said audio playback module;
   an audio output device coupled to said operation controller and configured to output the audio signals received from said operation controller; and
   a function expanding interface coupled to said operation controller and said external portable electronic device and configured to transmit the information of the audio data accessible to said audio playback module for reception and subsequent display by said external portable electronic device;
   wherein:
      said function expanding interface is further configured to permit transmission of external audio signals from said external portable electronic device to said operation controller;
      said audio output device includes a headphone interface that has a first channel unit and a second channel unit, and a speaker interface; and
      said operation controller further has an output control module that is coupled to said headphone interface and said speaker interface and that is operable to modulate and to output the audio signals from said audio playback module and the external audio signals received from said function expanding interface to said first and second channel units, respectively, and to provide one of the audio signals from said audio playback module and the external audio signals received from said function expanding interface to said speaker interface in response to control flow said user control device.

6. The audio control system as claimed in claim 5, wherein:
   the information of the audio data transmitted to said external portable electronic device includes a list of audio files accessible to said audio playback module;
   said external portable electronic device is operable for selecting one of the audio files in the list and for requesting from said operation controller the selected one of the audio files in the list via said function expanding interface;

said operation controller is further operable to provide the audio data requested by said external portable electronic device to said function expanding interface for receipt by said external portable electronic device; and said external portable electronic device is further operable to process the audio data received from said operation controller so as to generate the external audio signals.

7. The audio control system as claimed in claim 6, wherein said audio playback module includes:

an audio playback unit operable to access the audio data stored in said data storage device;

a sound effect processing unit operable to generate the audio signals by performing at least one of playback speed adjustment and audio mixing processing on the audio data accessed by said audio playback unit in response to control from said user control device; and a volume adjusting unit operable to perform volume adjustment on the audio signals.

8. The audio control system as claimed in claim 7, wherein said external portable electronic device includes a touch control display, and said external portable electronic device is operable to generate the external audio signals by performing at least one of volume adjustment, playback speed adjustment and audio mixing processing on the audio data received from said operation controller in response to user operation of said touch control display.

9. The audio control system as claimed in claim 6, wherein said external portable electronic device includes a touch control display, and said external portable electronic device is operable to generate the external audio signals by performing at least one of volume adjustment, playback speed adjustment and audio mixing processing on the audio data received from said operation controller in response to user operation of said touch control display.

10. The audio control system as claimed in claim 5, wherein said audio control apparatus further includes an external data source interface that is coupled to said operation controller and that is for connecting to an external storage device having external audio data stored therein, said audio playback module being operable to access the audio data stored in said data storage device and the external audio data stored in the external storage device.

11. The audio control system as claimed in claim 5, wherein said audio control apparatus further includes a character display coupled to and driven by said operation controller to display the information of the audio data accessed by said audio playback module.

12. The audio control system as claimed in claim 5, wherein said external portable electronic device is one of a smart phone, a tablet computer, and a media player.

\* \* \* \* \*